(12) United States Patent
Sexton et al.

(10) Patent No.: US 6,782,532 B1
(45) Date of Patent: Aug. 24, 2004

(54) OBJECT TYPE SYSTEM FOR A RUN-TIME ENVIRONMENT USING GENERATED HIGH-ORDER LANGUAGE INSTRUCTIONS FOR GENERIC FUNCTIONS

(75) Inventors: Harlan Sexton, Menlo Park, CA (US); David Unietis, Menlo Park, CA (US); Peter Benson, Boulder, UT (US); Mark Jungerman, San Francisco, CA (US); Scott Meyer, Pacifica, CA (US); David Rosenberg, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/515,887

(22) Filed: Feb. 29, 2000

Related U.S. Application Data

(60) Provisional application No. 60/185,139, filed on Feb. 25, 2000, provisional application No. 60/185,138, filed on Feb. 25, 2000, provisional application No. 60/185,137, filed on Feb. 25, 2000, provisional application No. 60/185,136, filed on Feb. 25, 2000, provisional application No. 60/185,135, filed on Feb. 25, 2000, provisional application No. 60/185,134, filed on Feb. 25, 2000, and provisional application No. 60/160,759, filed on Oct. 21, 1999.

(51) Int. Cl.$^7$ ............................................... G06F 9/45
(52) U.S. Cl. ................................... 717/136; 706/13
(58) Field of Search ....................... 717/106, 108, 717/116, 136, 133; 712/209; 310/316, 315; 706/13

(56) References Cited

U.S. PATENT DOCUMENTS

| | | | | |
|---|---|---|---|---|
| 5,093,914 A | * | 3/1992 | Coplien et al. | 717/129 |
| 5,689,703 A | * | 11/1997 | Atkinson et al. | 707/103 R |
| 5,768,505 A | * | 6/1998 | Gilchrist et al. | 709/201 |
| 5,873,097 A | * | 2/1999 | Harris et al. | 707/203 |
| 5,987,247 A | * | 11/1999 | Lau | 717/100 |
| 6,016,495 A | * | 1/2000 | McKeehan et al. | 707/103 R |
| H1837 H | * | 2/2000 | Fletcher et al. | 455/433 |
| 6,052,670 A | * | 4/2000 | Johnson | 705/27 |
| 6,061,690 A | * | 5/2000 | Nori et al. | 707/103 R |
| 6,081,832 A | * | 6/2000 | Gilchrist et al. | 709/206 |
| 6,101,502 A | * | 8/2000 | Heubner et al. | 707/103 R |
| 6,105,056 A | * | 8/2000 | Gilchrist et al. | 709/206 |
| 6,134,540 A | * | 10/2000 | Carey et al. | 707/2 |
| 6,199,068 B1 | * | 3/2001 | Carpenter | 707/100 |
| 6,205,471 B1 | * | 3/2001 | Gilchrist et al. | 709/206 |
| 6,236,994 B1 | * | 5/2001 | Swartz et al. | 707/6 |
| 6,266,708 B1 | * | 7/2001 | Austvold et al. | 709/315 |
| 6,308,225 B1 | * | 10/2001 | Schofield | 709/316 |
| 6,339,820 B1 | * | 1/2002 | Baentsch et al. | 712/209 |
| 6,427,231 B1 | * | 7/2002 | Burke et al. | 717/116 |

OTHER PUBLICATIONS

"Dictionary of Object Technology", Donald G. Firesmith et al, published Sep. 22, 1995, pp. 55, 184–186, 314–315, 330–335.*

Object–Oriented Analysis and Design with Applications, Grady Booch, published Sep. 10, 1993, pp. 473–489.*

"The Design and Evolution of C++", Bjarne Stroustrup, published Mar. 9, 1994, pp. 1–14, 223–255, 305–336.*

"Software Systems Construction With Examples in ADA", Bo Sanden, Prentice Hall, 1994, pp. 104–109.*

GOODS Generic Object Oriented Database, www.ispras, no publish date.*

"Client/ Server Programming With JAVA and CORBA" Second Edition Robert Orfali et al., pp. 63–75, published Jan. 30, 1997.*

* cited by examiner

Primary Examiner—Todd Ingberg
(74) Attorney, Agent, or Firm—Ditthavong & Carlson, P.C.

(57) ABSTRACT

A static object system is provided to allow for code for implementing a run-time environment to be automatically generated that is compatible with a high-order systems programming language such as C. In particular, the meta-object system is static, object-oriented, and uses generic functions that can dispatch to an appropriate member function based on the types of one or more arguments. In one embodiment, the generated dispatch code uses a multi-way conditional branch.

18 Claims, 3 Drawing Sheets

OBJECT TYPE SYSTEM FOR A RUN-TIME ENVIRONMENT USING GENERATED HIGH-ORDER LANGUAGE INSTRUCTIONS FOR GENERIC FUNCTIONS

RELATED APPLICATIONS

The present application claims the benefit of the following U.S. Provisional Patent Applications, the contents of all of which are incorporated by reference in their entirety:

U.S. Provisional Patent Application Serial No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al.;

U.S. Provisional Patent Application Serial No. 60/185,136 entitled MEMORY MANAGEMENT USING MIGRATION FOR A RUN-TIME ENVIRONMENT, filed on Feb. 25, 2000 by Harlan Sexton et al.;

U.S. Provisional Patent Application Serial No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton;

U.S. Provisional Patent Application Serial No. 60/185,138 entitled STATIC OBJECT SYSTEM AND METHODOLOGY FOR IMPLEMENTING A RUN-TIME ENVIRONMENT, filed on Feb. 25, 2000 by Harlan Sexton et al.;

U.S. Provisional Patent Application Serial No. 60/185,134 entitled AURORA NATIVE COMPILATION, filed on Feb. 25, 2000 by Dmitry Nizhegorodov;

U.S. Provisional Patent Application Serial No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al.; and U.S. Provisional Patent Application Serial No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer.

The present application is related to the following commonly-assigned, co-pending U.S. Patent Applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al. now U.S. Pat. No. 6,457,019;

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al. now U.S. Pat. No. 6,499,095;

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.;

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al. now U.S. Pat. No. 6,434,685;

U.S. patent application Ser. No. 09/320,578 entitled METHOD AND ARTICLE FOR ACCESSING SLOTS OF PAGED OBJECTS, filed on May 27, 1999 by Harlan Sexton et al. now U.S. Pat. No. 6,401,185;

U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al. now allowed;

U.S. patent application Ser. No. 09/512,619 entitled METHOD FOR MANAGING MEMORY USING EXPLICIT, LAZY INITIALIZATION IN A RUN-TIME ENVIRONMENT, filed on Feb. 25, 2000 by Harlan Sexton et al.;

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al.;

U.S. patent application Ser. No. 09/512,621 entitled SYSTEM AND METHODOLOGY FOR SUPPORTING A PLATFORM INDEPENDENT OBJECT FORMAT FOR A RUN-TIME ENVIRONMENT, filed on Feb. 25, 2000 by Harlan Sexton et al.;

U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al.; and U.S. patent application Ser. No. 09/612,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al.

FIELD OF THE INVENTION

The present invention relates to computer systems and more particularly to implementing a run-time environment.

BACKGROUND OF THE INVENTION

A dynamic run-time environment for a language such as JAVA™ is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

In general, all implementations of a language run-time environment are built upon a low-level substrate that provides proto-language services. These services may include memory management, method dispatching, operating system (or other encapsulating environment) services, and outcall mechanisms. Typically, the low-level substrate and a schema of the system classes belonging to the run-time environment are hand written in a systems programming language such as C or C++ as well as assembly language subroutines. Conventional techniques for implementing the low-level substrate services, however, suffer from several disadvantages, depending on the implementation language being used.

For example, if the low-level substrate is written in the C programming language and assembly language, the resulting code tends to be difficult to design and maintain in comparison with object-oriented programming languages. Use of an objected-oriented language like the C++ programming language, however, also suffers from disadvantages. In particular, C++ member functions (methods) are difficult to interface with generic C environmental code due to compiler name-mangling, and sometimes involve run-time overhead in method dispatching (i.e. invoking virtual member functions requires an indirection through a virtual table). Furthermore, C++ is less portable than C.

Therefore, there exists a need for a way to implement low-level substrate services that is portable, efficient, and compatible with generic environmental code while attaining benefits associated with object-oriented programming.

SUMMARY OF THE INVENTION

This and other needs are addressed by the present invention, in which a static, object-oriented meta-object system is provided for implementing a run-time environment. In particular, code is generated by the meta-object system that is compatible with a high-order systems programming language such as C. Since the meta-object system is object-oriented, the benefits of ease of design and maintenance associated with object-oriented programming are attained. Since meta-object system is static, each invoked method can be identified at compile-time, leading to efficient method dispatching. Finally, the meta-object system methods are translated into "generic functions" in a portable systems programming language such as C, thereby facilitating linkage with environmental code.

A generic function is a function that dispatches on the types of one or more of its arguments. For example, a generic function foo (A, B) could dispatch on either the arguments A, B, or both. A generic function that dispatches on only one argument provides the semantics of a normal method call, but unlike C++ methods, generic functions can dispatch on a plurality of arguments.

Accordingly, one aspect of the invention pertains to a method and software for implementing a run-time environment, comprising the computer-implemented steps of: defining an object-oriented type system for a plurality of objects being associated with respective operations; accessing a description of a generic function specifying an operation to be invoked based on an argument; and generating high-order language instructions for receiving an object as the argument and invoking a corresponding operation based on a type of the object.

Another aspect of the invention involves a method and software for implementing a run-time environment with a meta-object system in which an object-oriented type system is defined, comprising the computer-implemented steps of: accessing a description of a generic function specifying an operation to be dispatched based on more than one argument; and generating high-order language instructions for more than one object as the arguments and dispatching a corresponding operation based on the types of the objects.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for implementing a run-time environment are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
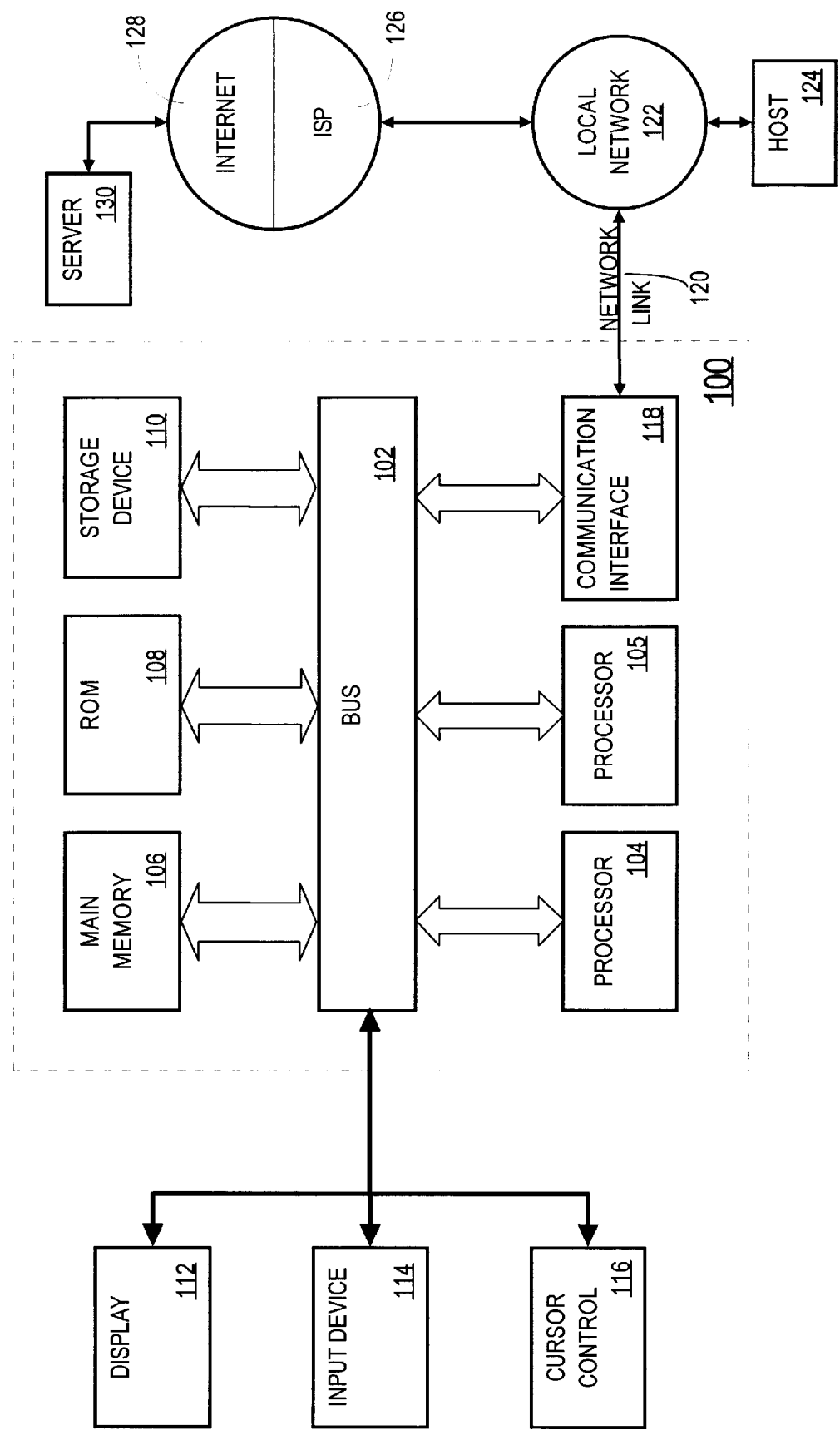
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing a run-time environment. According to one embodiment of the invention, implementing a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for implementing a run-time environment as described herein. Processor 104 may execute the code as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105. "Secondary storage" as used herein refers to storage elements, other than virtual memory, accessible to a process. Secondary storage may be local or networked. Local secondary storage, furnished by storage device 100 on computer system 100, typically takes the form of a random access storage device such as a magnetic or optical disk. Networked secondary storage is provided by storage devices on other computer systems, for example on host 124, accessible over a local area network 122, or server 130, accessible over a wide area network such as the Internet.

Meta-object System

One aspect of the invention relates to a meta-object system that provides a static, object-oriented type system for generating code to implement a run-time environment. Preferably, the generated code is in a portable high-order systems programming language such as the C programming language. Since the meta-object system is a static type system, each invoked method can be identified at compile-time, leading to efficient method dispatching, without having to indirect through a virtual table. Finally, the meta-object system methods are translated into "generic functions" in a portable systems programming language such as C, thereby facilitating linkage with environmental code.

The meta-object system includes code generation facility that automatically generates appropriate high-level language instructions for implementing generic functions to support method dispatching for objects supported by the meta-object system. For example, the code generation facility can generate C programming language macros, C++ inline functions, or other kinds of subroutines, procedures, and functions appropriate to the high-level language compiler for the different platforms. In addition, in some embodiments, code generation facility may also generate appropriate high-level language instructions for laying out, accessing, and modifying the member variables of the object based on platform-specific descriptions of primitive types.

Figure 2:
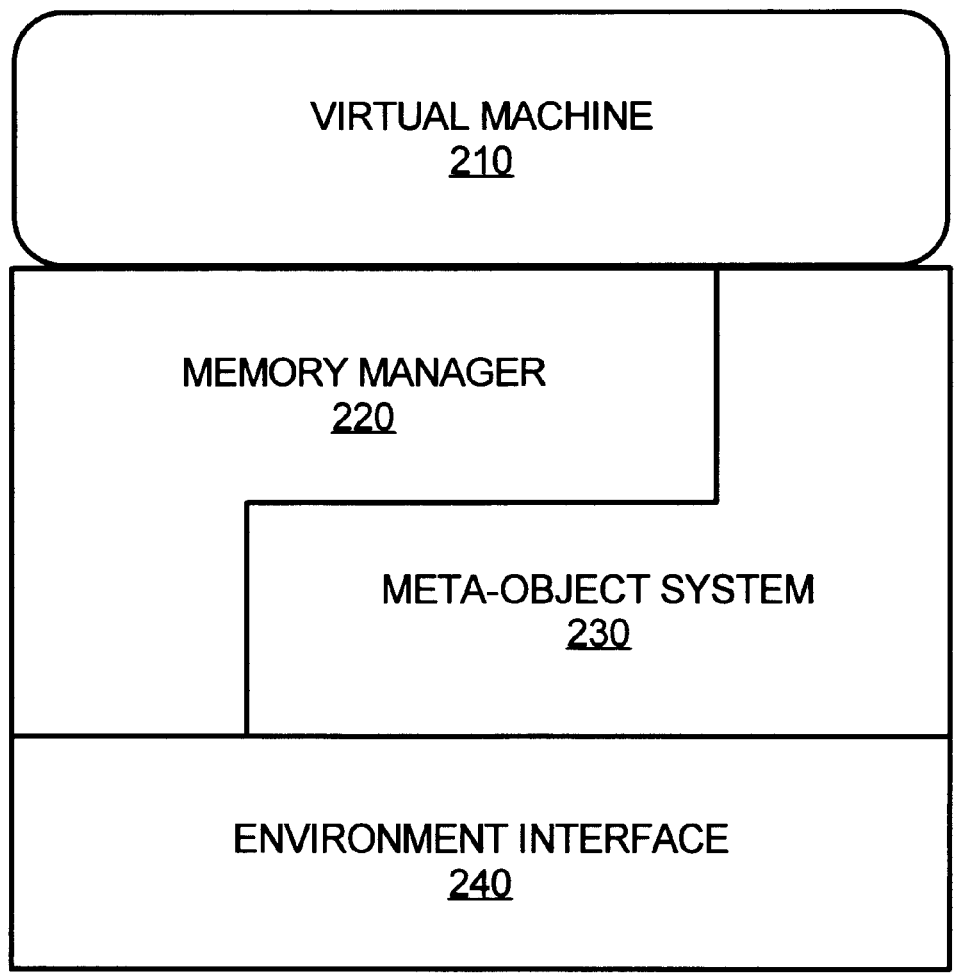
FIG. 2 is a conceptual diagram of a run-time environment in accordance with one embodiment of the present invention.

Referring to FIG. 2, depicted is a conceptual diagram that illustrates the relationship of a meta-object system 230 with respect to other components of a run-time environment. The bottom layer, the environment interface 240, insulates the run-time environment from the "outside" world as by providing an encapsulation and interface to operating system calls. The memory manager 220 and the meta-object system 230 together provide a foundation on which the rest of the virtual machine 210 is implemented. The virtual machine 210, for example, can be a JAVA™ virtual machine. The area of overlap between the memory manager 220 and the meta-object system 230 is reflected in the reference model used by objects in the virtual machine 210.

For example, the reference model can require objects of a short duration to be implemented in a native high-level language format for reasons of efficiency, because recently created objects are more likely to be used. On the other hand, the reference model would require objects of a longer duration to be implemented in a platform-independent format for reasons of ease of portability, because longer lasting objects are more likely to be persistent and used by another process, even by one on another computer. Therefore, the memory manager 220 and the meta-object system 230 serve to cooperate in allocating, deallocating, and migrating objects to the appropriate memory. For instance, an object can be allocated by the memory manager 220 in a short duration memory in a native format controlled by the meta-object system 230 and then later migrated to a longer duration memory in a platform-independent format.

Generic Functions

Figure 3:
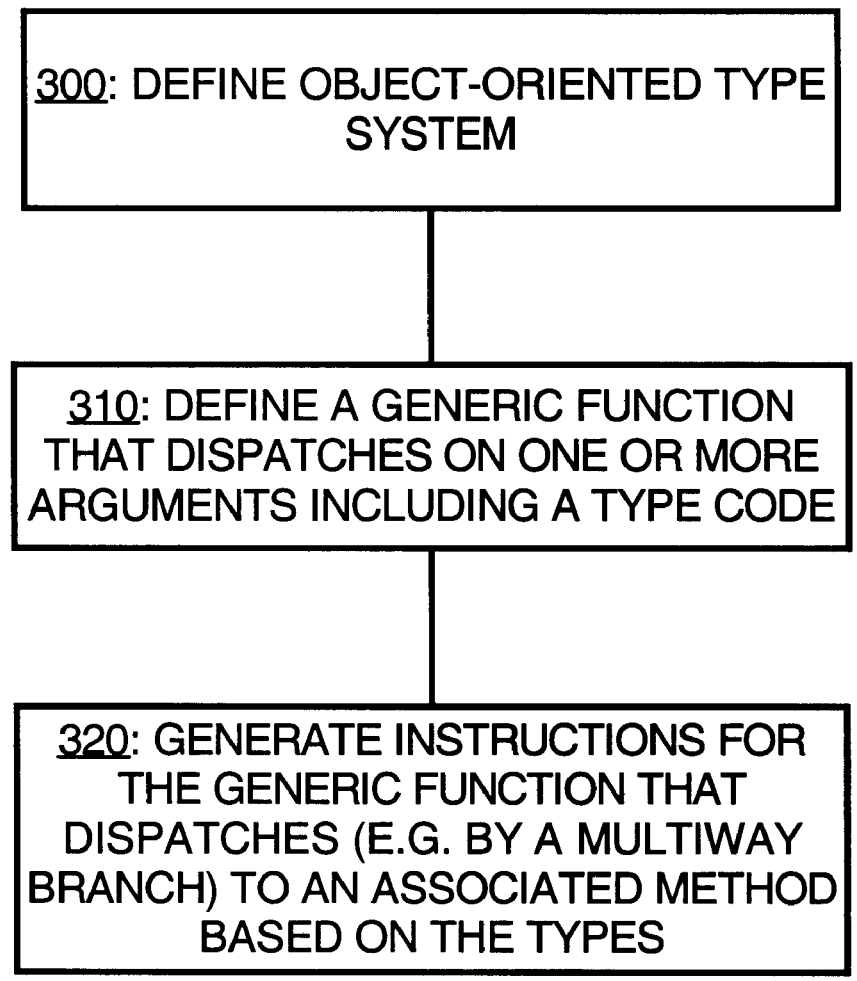
FIG. 3 is a flow diagram of generating generic functions in accordance with one embodiment of the present invention.

Referring to FIG. 3, depicted is a flow diagram illustrating the generation of generic functions in accordance with one aspect of the present invention. At block 300, an object-oriented type system for the meta-object system is defined. In one embodiment, a Scheme-like language is used to define classes of objects and their superclasses, but other syntactical notations may also be used. Like other object-oriented languages, specifying the name of the superclass provides for inheritance. For example, an implementer may define a class of binary tree nodes as a subclass of a root eobject class as follows:

(define-object eotnode
      (super eobject)
      (desc "a binary tree node")
      (slots (left eoref) (right eoref) (data eoref)))

In this definition, a binary tree node is specified by the (super <object>) option as deriving from the eobject super-class and contains the three slots, all which are references. Pursuant to the inheritance property of object-oriented programming languages, all generic functions that are applicable to the eobject superclass and that are not overridden by the eotnode subclass are available to objects of the eotnode subclass. For example, an eosize generic function might be defined to return the size of the object. If a class-specific eosize function has not been defined for the eotnode type, then the eosize function for the eobject type would be used. When an object is defined, the object is assigned a type code that is stored in the header of the object to identify the type of the object.

At block 310, a generic function is defined. A "generic function" is a function that is applicable to one or more objects in the meta-object system, and, in one embodiment, are defined by a Scheme-like language form, but other syntactical notations may also be used. A generic function takes one or more object "dispatch" arguments, followed by zero or more additional arguments. Each generic function dispatch argument may be specified as either an object (possibly abstract) or as a list of objects. The generic function is "applicable" to all the object types in the list (or the single object) as well as all subclasses of these object types.

A generic function definition specifies the names of objects that provide the actual method implementations of the generic function. There must be a (defined or inherited) method definition for every object argument for which the generic function is applicable. For example, in the case of the eotnode, there must be eosize generic function either defined for the eotnode object (e.g. eosize_eotnode ( ))or inherited from the eobject root (e.g eosize_eobject( )).

For example, the following may be used to define the eosize generic function:

(define-generic eosize eomoss
      (args ((self eobject)))
      (return ub4)
      (methods eobject joe-obj eowisa eospacer)
      (comment "Return the size of <self> as a ub4.")

In this example, eosize is the name of the generic function, and eomoss.c is the name of the file into which the code for the generic function is written. The args option specifies that it has one argument, self. The return option specifies that the return type of the generic function eosize is ub4 (typically a typedef to an unsigned integer that is at least four bytes wide). The methods options specifies which objects (and their children) have their own eosize routine defined. In this case, the joe-obj objects have their own eosize methods. In the case of eotnode, the presence of its superclass eobject indicates that the eosize method for the eobject is to be used.

At block 320, the generic function definition and the type system of defined objects is processed to generate instructions for implementing the dispatch code for the generic function. Because all applicable types are known at the time of code generation, this dispatch can be implemented efficiently, e.g. with an indirection through a virtual table. In one embodiment, the generated dispatch code employ a multi-way conditional branch such as a C switch statement with cases for the applicable object type code to determine the correct specific function to call. In the example, generated C code for the eosize generic function would be as follows:

```
/* Return the size of , an eobject, as a ub4 */
ub4
eosize( eocontext* ctx, eobject* self)
{
    switch (EOGET_TYPECODE( ctx, self ))   {
    case JOE_OBJ_NREF_PAGED_TYPECODE:
    case JOE_OBJ_PTR_PAGED_TYPECODE:
    case JOE_OBJ_NREF_UNPAGED_TYPECODE:
    {
        return eosize_joe_obj( ctx, self );
    }
    case EOC_NREF_TYPECODE:
    case EOC_PTR_TYPECODE:
    {
        return eosize_eowisa( ctx, self );
    }
    case EOSPACER_TYPECODE:
    {
        return eosize_eospacer( ctx, self );
    }
    default:
    {
        return eosize eobject( ctx, self );
    }
    }
}
```

In this example, the predefined macro EOGET_TYPECODE is used to obtain the type code of the object (e.g. by extracting a value from a type code filed in the object's header). The extracted type code value is then made the basis for a multi-way conditional branch (e.g. a C switch statement in this example or an if-then-else-if chain in other implementations) that enables the appropriate object-specific eosize_<object>( ) function to be invoked. Objects that share a common implementation of the generic function are grouped together in the switch statement.

Although the present example does not illustrate dispatching on more than one argument, those generic functions that dispatch on more than one argument use nested multi-way conditional branches, for example, a switch within in a switch. In run-time environments, generic functions are used for such purposes as copying an object from one object memory to another, scanning all of the reference-containing slots in an object, printing the contents of an object (for debugging), and obtaining an object's hash value.

Accordingly, a system and methodology are described for implementing a run-time environment using a static meta-object system in which instructions are generated for dispatching a generic function invocation to a corresponding function based on the type of one or more objects. C programming language code or other such systems programming language code is generated, so the result is highly portable and compatible with existing general C environment code. Moreover, the meta-object system is static and the generated codes uses multi-way conditional branching, so the resulting code is efficient. Finally, the meta-object system is object-oriented, which helps avoid the pitfalls of designing and maintaining hand written low-level services.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for implementing a run-time environment, comprising the computer-implemented steps of:

defining an object-oriented type system for a plurality of objects being associated with respective operations;

defining a description of a generic function specifying an operation to be invoked based on an argument; and generating high-order language instructions for implementing the generic function based on the description, said instructions including instructions for receiving an object as the argument, determining a type of the object, and invoking the specified operation based on the type of the object.

2. The method according to claim 1, wherein:

the instructions for determining the type of the object include checking a type code in a header of the object; and the instructions for invoking the specified operation based on the type of the object include invoking the specified operation based on the type code.

3. The method according to claim 2, wherein the instructions for invoking the specified operation based on the type code includes instructions for a multi-way conditional branch based on the type code.

4. The method according to claim 3, wherein the instructions for a multi-way conditional branch includes a C programming language switch statement.

5. The method according to claim 1, wherein the high-order language is the C programming language.

6. The method according to claim 1, wherein the object and the operation are defined within the object-oriented type system.

7. The method according to claim 6, wherein the operation is defined for a superclass of the object in the object-oriented type system.

8. A method for implementing a run-time environment with a meta-object system in which an object-oriented type system is defined, comprising the computer-implemented steps of:

defining a description of a generic function specifying an operation to be dispatched based on a plurality of arguments; and generating high-order language instructions for implementing the generic function based on the description, said instructions including instructions for receiving a plurality of objects as the arguments, determining a plurality of types for the objects, and dispatching the specified operation based on the types of the objects.

9. The method according to claim 8, wherein the instructions for dispatching the specified operation include a nested multi-way conditional branch.

10. A computer-readable medium bearing instructions for implementing a run-time environment, said instructions being arranged to cause one or more processors upon execution thereby to perform the steps of:

defining an object-oriented type system for a plurality of objects being associated with respective operations;

defining a description of a generic function specifying an operation to be invoked based on an argument; and generating high-order language instructions for implementing the generic function based on the description, said instructions including instructions for receiving an object as the argument, determining a type of the object received as the argument, and invoking the specified operation based on the type of the object.

11. The computer-readable medium according to claim 10, wherein:

the instructions for determining the type of the object include checking a type code in a header of the object; and the instructions for invoking the specified operation based on the type of the object include invoking the specified operation based on the type code.

12. The computer-readable medium according to claim 11, wherein the instructions for invoking the specified operation based on the type code includes instructions for a multi-way conditional branch based on the type code.

13. The computer-readable medium according to claim 12, wherein the instructions for a multi-way conditional branch includes a C programming language switch statement.

14. The computer-readable medium according to claim 10, wherein the high-order language is the C programming language.

15. The computer-readable medium according to claim 10, wherein the object and the operation are defined within the object-oriented type system.

16. The computer-readable medium according to claim 15, wherein the operation is defined for a superclass of the object in the object-oriented type system.

17. A computer-readable medium bearing instructions for implementing a run-time environment with a meta-object system in which an object-oriented type system is defined, said instructions being arranged to cause one or more processors upon execution thereby to perform the steps of:

defining a description of a generic function specifying an operation to be dispatched based on a plurality of arguments; and generating high-order language instructions for implementing the generic function based on the description, said instructions including instructions for receiving a plurality of objects as the arguments, determining a plurality of types for the objects, and dispatching the specified operation based on the types of the objects.

18. The computer-readable medium according to claim 17, wherein the instructions for dispatching the specified operation include a nested multi-way conditional branch.

\* \* \* \* \*